(12) United States Patent
Yuk et al.

(10) Patent No.: US 11,217,818 B2
(45) Date of Patent: Jan. 4, 2022

(54) SODIUM ION STORAGE MATERIAL

(71) Applicant: KOREA ADVANCED INSTITUTE OF SCIENCE AND TECHNOLOGY, Daejeon (KR)

(72) Inventors: Jong Min Yuk, Daejeon (KR); Jae Yeol Park, Daejeon (KR); Sung Joo Kim, Daejeon (KR)

(*) Notice: Subject to any disclaimer, the term of this patent is extended or adjusted under 35 U.S.C. 154(b) by 0 days.

(21) Appl. No.: 16/633,164

(22) PCT Filed: Jul. 25, 2018

(86) PCT No.: PCT/KR2018/008436
§ 371 (c)(1),
(2) Date: Jan. 23, 2020

(87) PCT Pub. No.: WO2019/022514
PCT Pub. Date: Jan. 31, 2019

(65) Prior Publication Data
US 2020/0153032 A1    May 14, 2020

(30) Foreign Application Priority Data

Jul. 27, 2017 (KR) .................. 10-2017-0095590
Jul. 16, 2018 (KR) .................. 10-2018-0082299

(51) Int. Cl.
  *H01M 10/054*    (2010.01)
  *H01M 4/58*    (2010.01)
  (Continued)

(52) U.S. Cl.
  CPC .......... *H01M 10/054* (2013.01); *C01G 3/12* (2013.01); *H01M 4/48* (2013.01); *H01M 4/5815* (2013.01);
  (Continued)

(58) Field of Classification Search
  None
  See application file for complete search history.

(56) References Cited

U.S. PATENT DOCUMENTS

| | | | | |
|---|---|---|---|---|
| 5,413,881 | A * | 5/1995 | Licht ................ | H01M 6/04 429/105 |
| 2016/0072151 | A1* | 3/2016 | Zhang ................ | H01M 4/5815 429/331 |
| 2018/0301738 | A1* | 10/2018 | Kim ................ | H01M 50/109 |

FOREIGN PATENT DOCUMENTS

| JP | 2019-533882 A | 11/2019 |
|---|---|---|
| KR | 20120020962 A | 3/2012 |

(Continued)

*Primary Examiner* — Daniel S Gatewood
(74) *Attorney, Agent, or Firm* — Harvest IP Law, LLP

(57) ABSTRACT

The present disclosure relates to a sodium-ion storage material and an electrode material for a sodium-ion battery, an electrode material for a seawater battery, an electrode for a sodium-ion battery, an electrode for a seawater battery, a sodium-ion battery, and a seawater battery, which include the sodium-ion storage material. Specifically, the sodium-ion storage material may include one or more materials selected from the group consisting of $Cu_xS$, $FeS$, $FeS_2$, $Ni_3S$, $NbS_2$, $SbO_x$, $SbS_x$, $SnS$ and $SnS_2$, wherein $0<x\leq2$. When the sodium-ion storage material according to the present disclosure is used, it may exhibit high discharge capacity, and when the sodium-ion storage material is applied to a sodium-ion battery which is a secondary battery, it may exhibit excellent charge/discharge cycle characteristics.

15 Claims, 13 Drawing Sheets

(51) Int. Cl.
*H01M 4/48* (2010.01)
*H01M 4/62* (2006.01)
*H01M 4/66* (2006.01)
*C01G 3/12* (2006.01)
*H01M 4/04* (2006.01)
*B82Y 30/00* (2011.01)

(52) U.S. Cl.
CPC ........... *H01M 4/623* (2013.01); *H01M 4/663* (2013.01); *B82Y 30/00* (2013.01); *C01P 2002/72* (2013.01); *C01P 2004/24* (2013.01); *C01P 2004/64* (2013.01); *H01M 4/049* (2013.01); *H01M 2220/20* (2013.01)

(56) References Cited

FOREIGN PATENT DOCUMENTS

KR       20150088826 A      8/2015
WO      WO-2016190659 A1 *  12/2016    ............ H01M 4/661

* cited by examiner

[FIG. 1A]
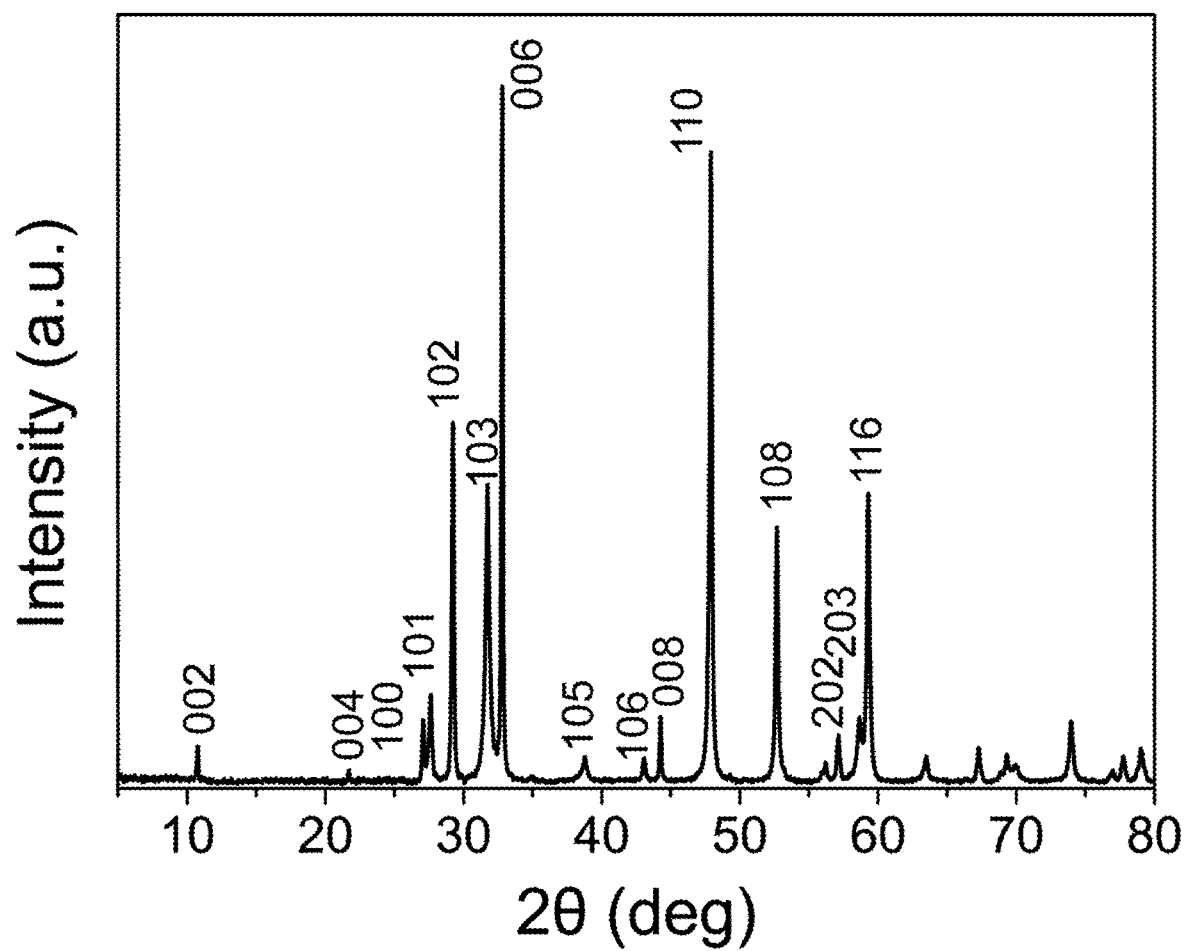

[FIG. 1B]
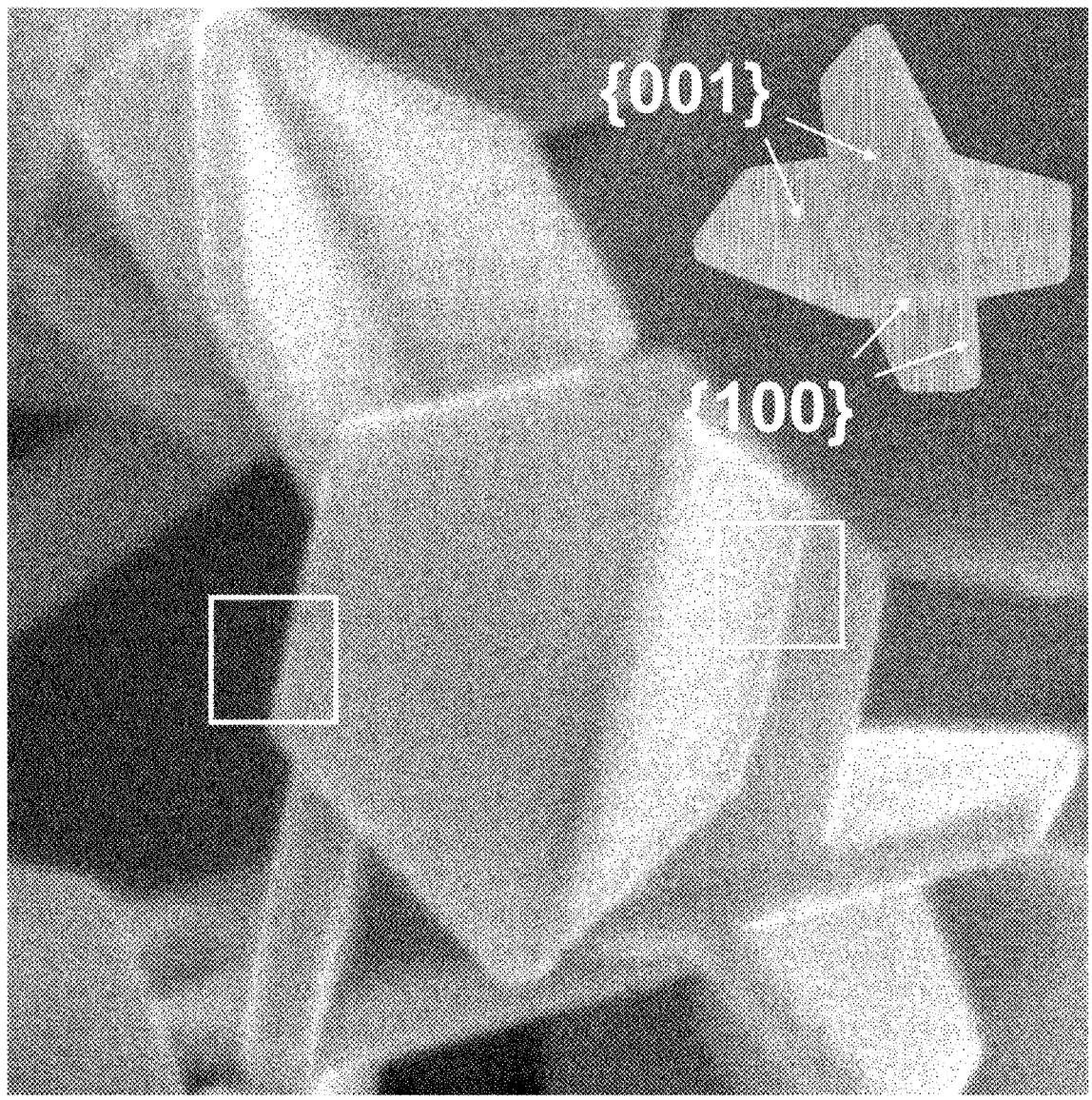

[FIG. 1C]
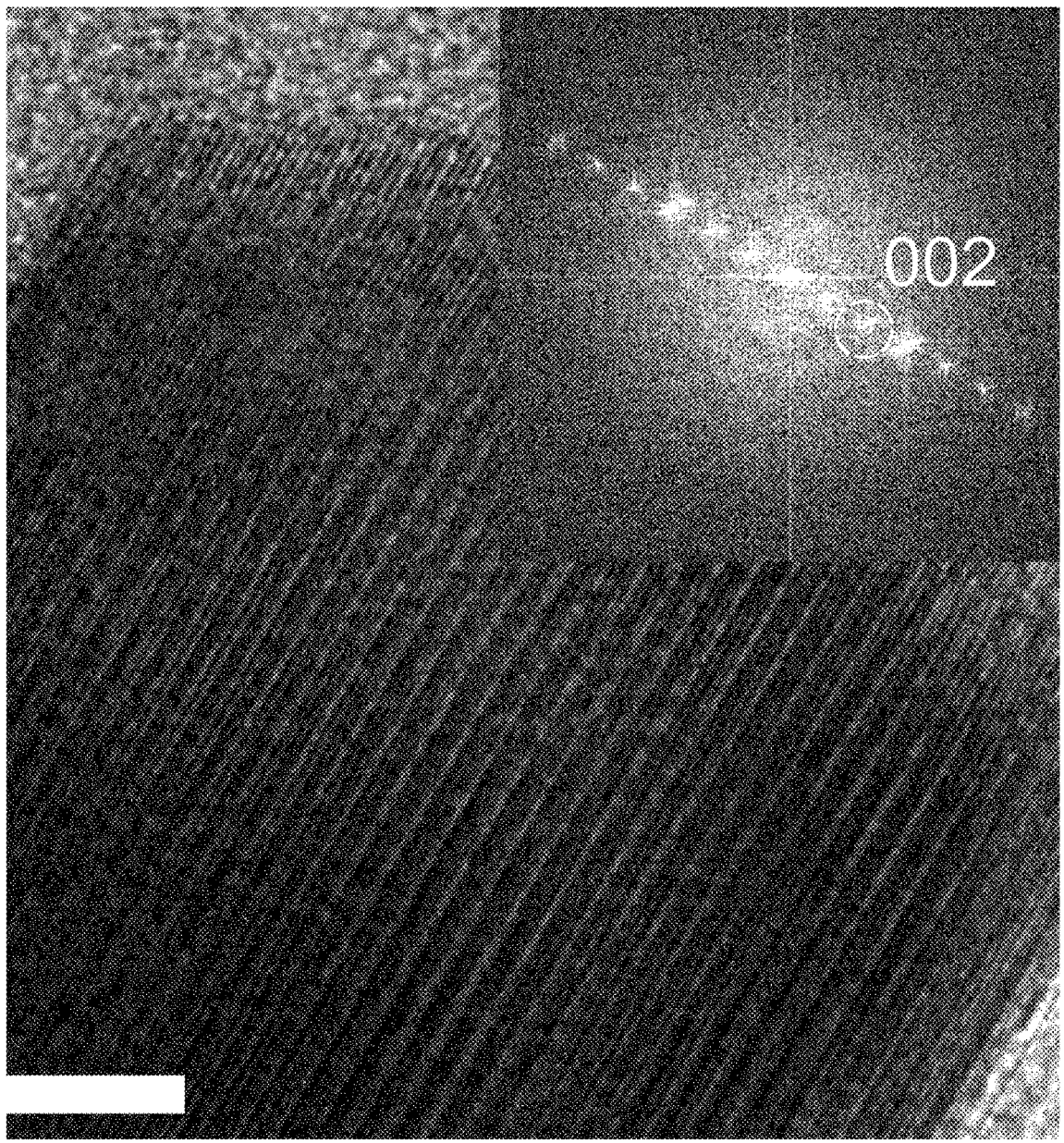

[FIG. 1D]
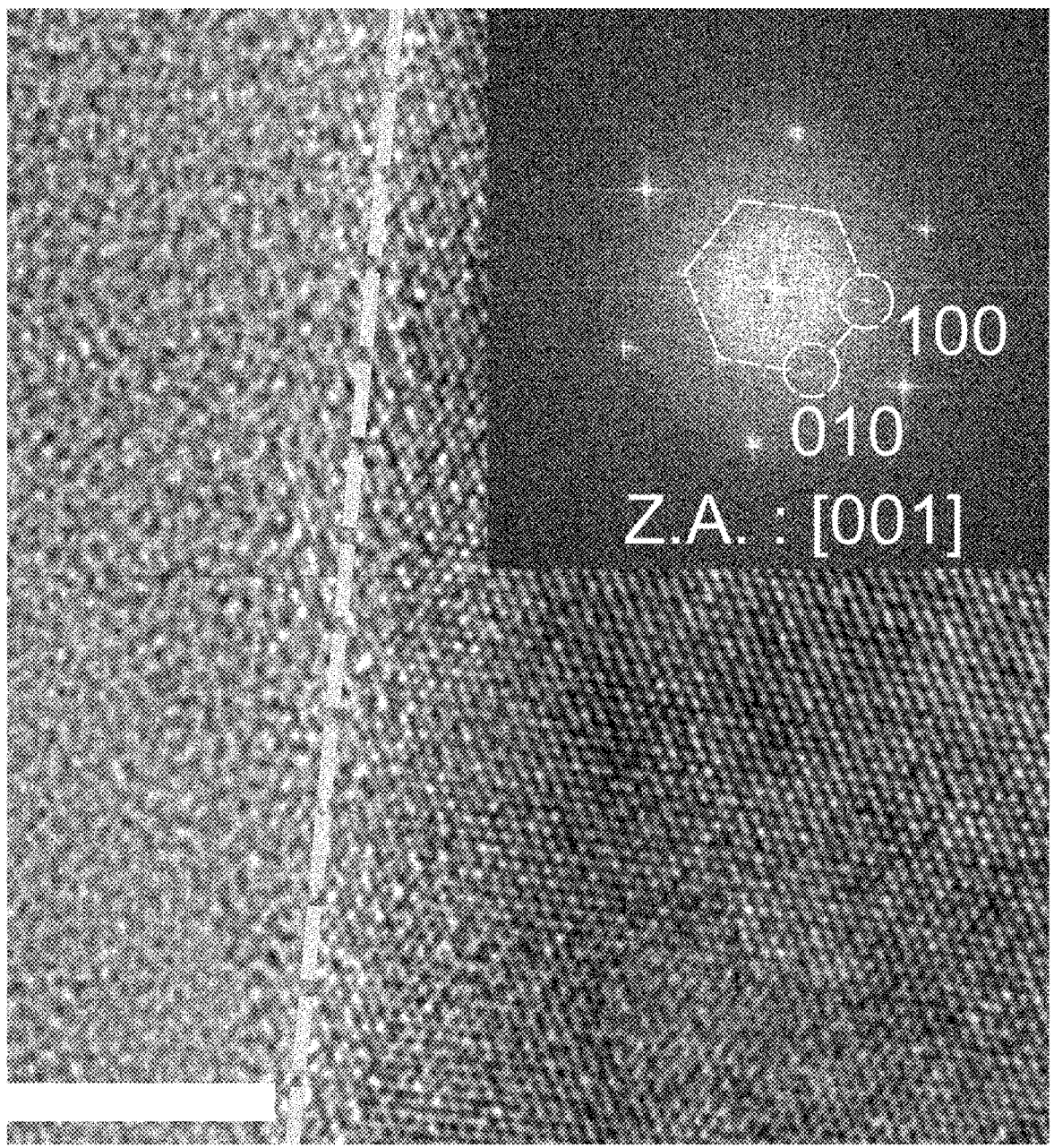

[FIG. 2A]
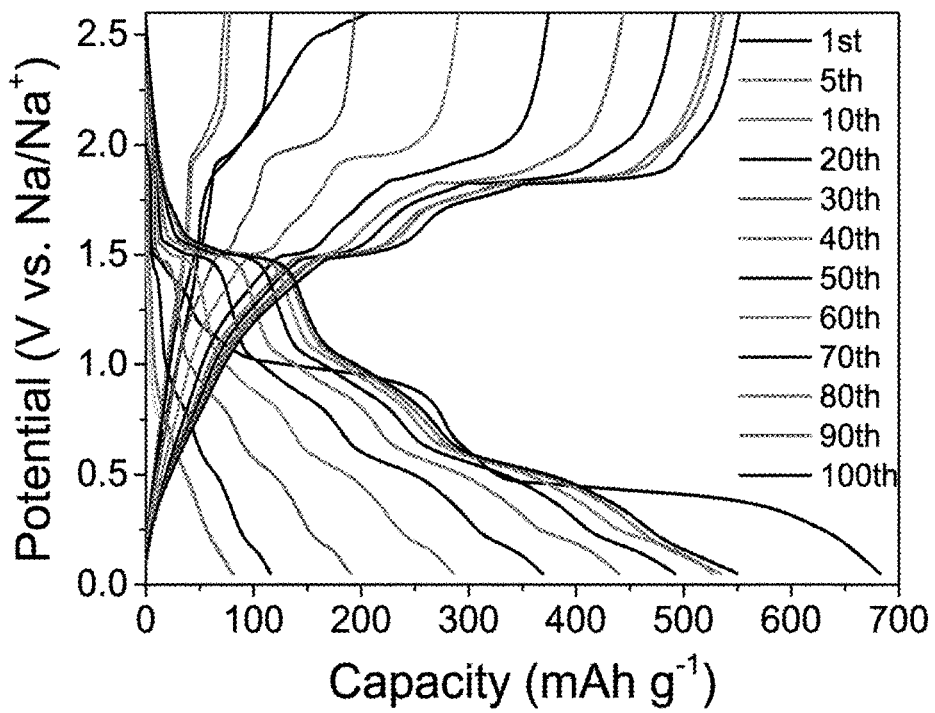
[FIG. 2B]
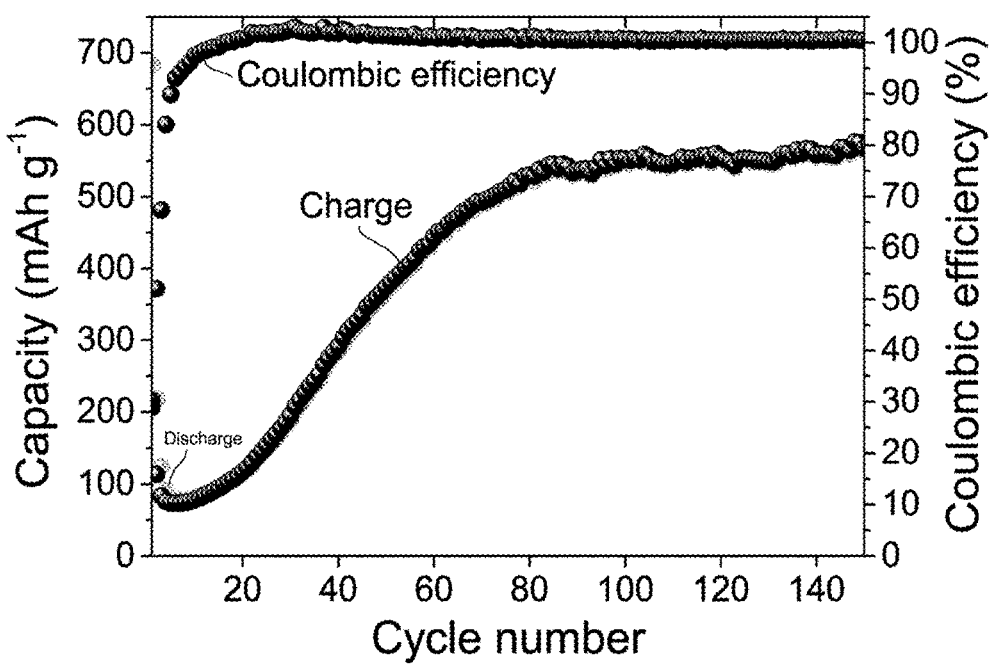

[FIG. 3A]
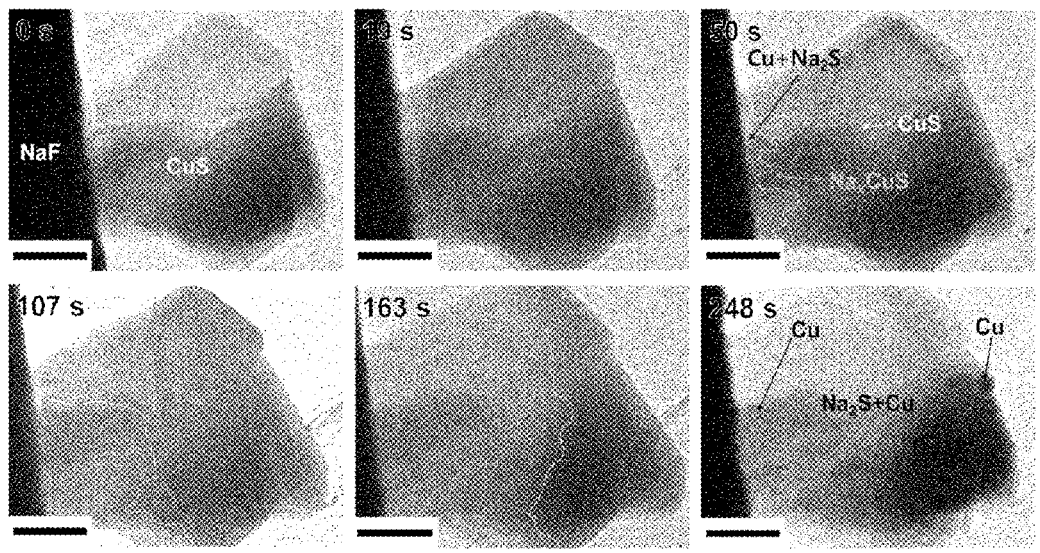
[FIG. 3B]
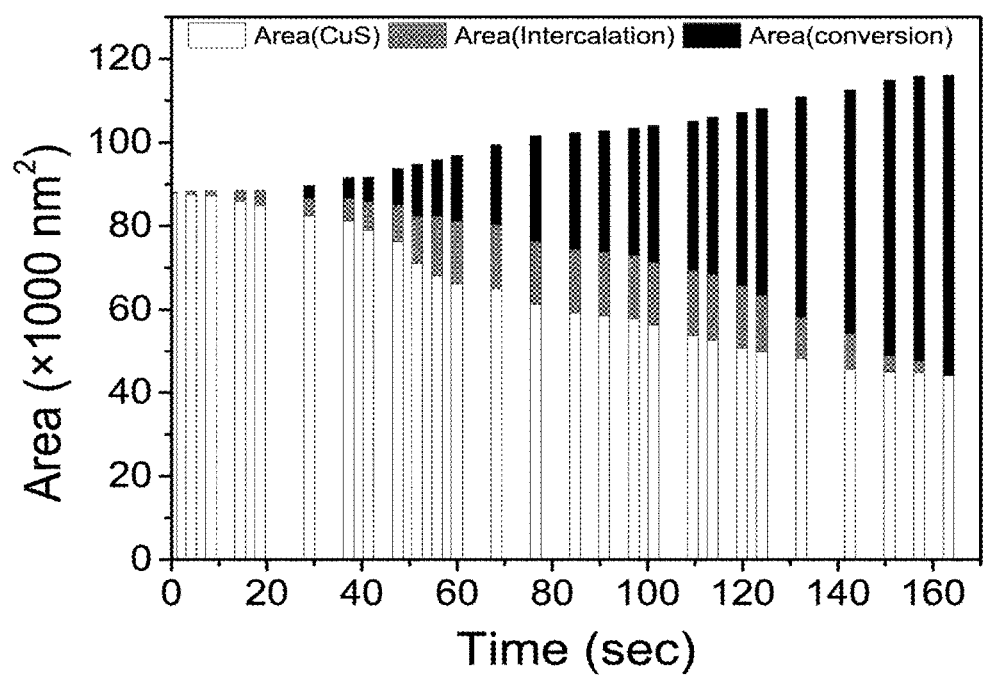

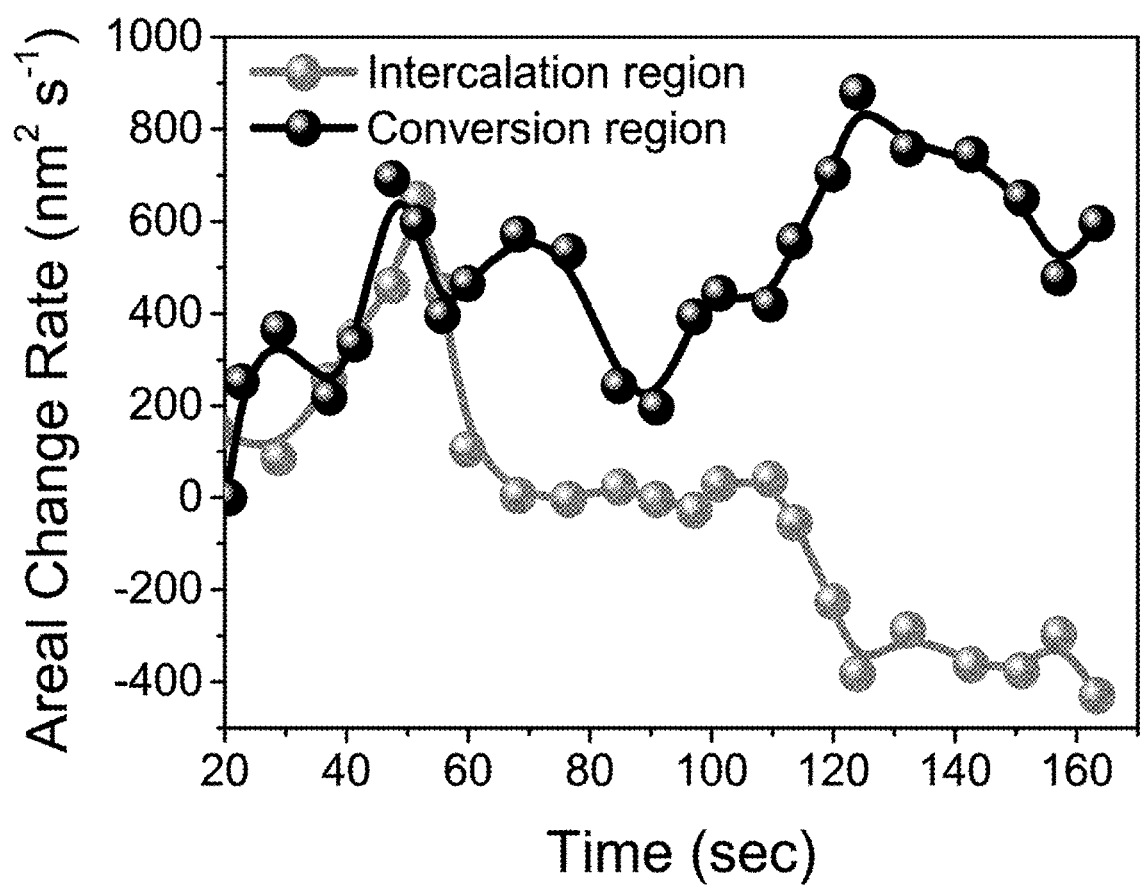
[FIG. 3C]

[FIG. 4]
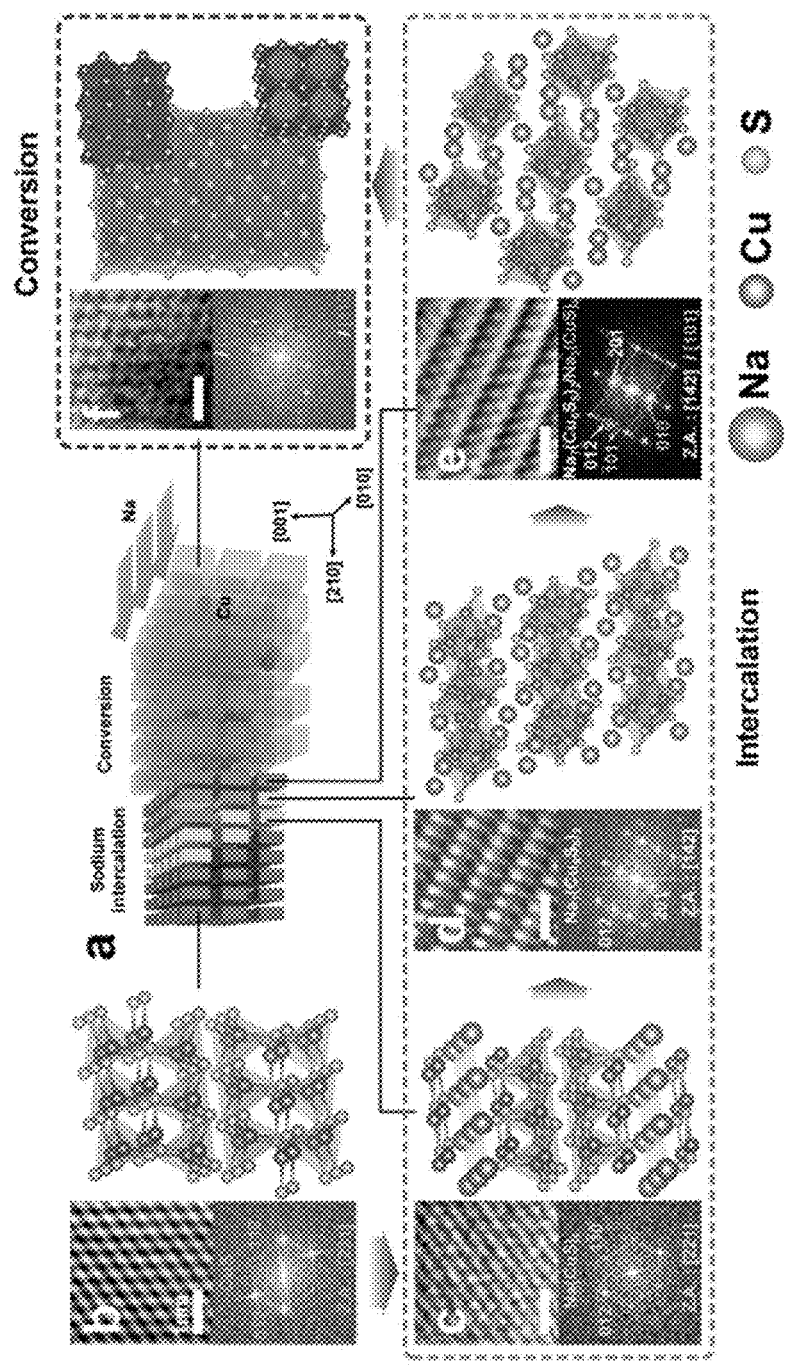

[FIG. 5A]
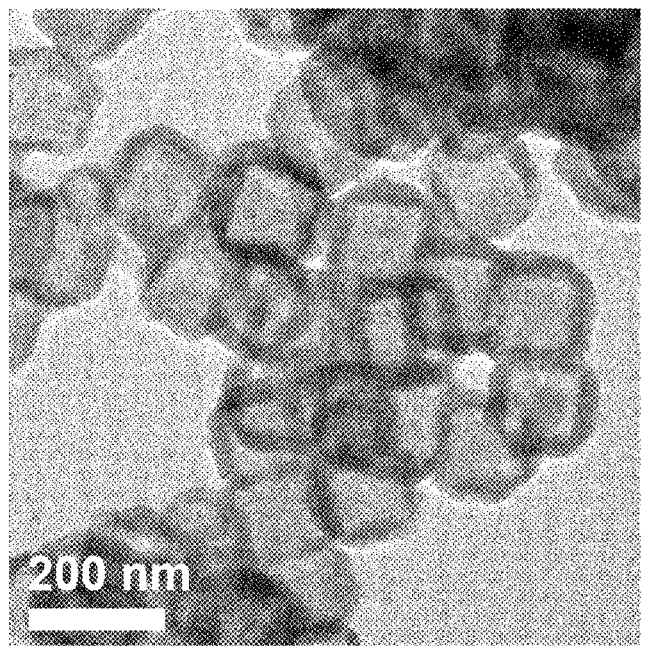
[FIG. 5B]
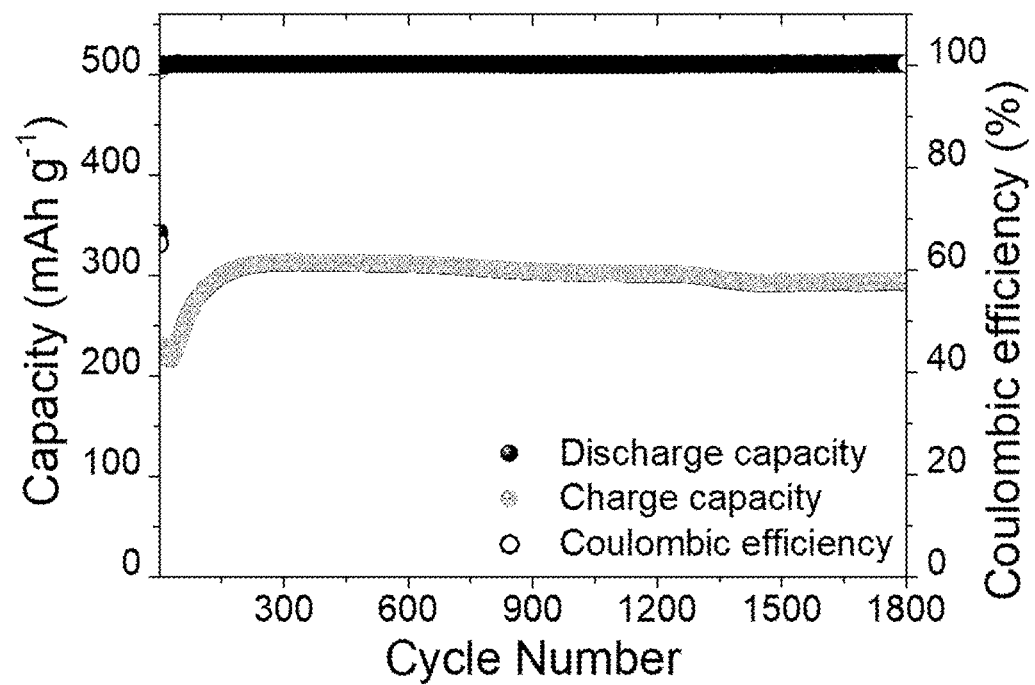

[FIG. 6A]
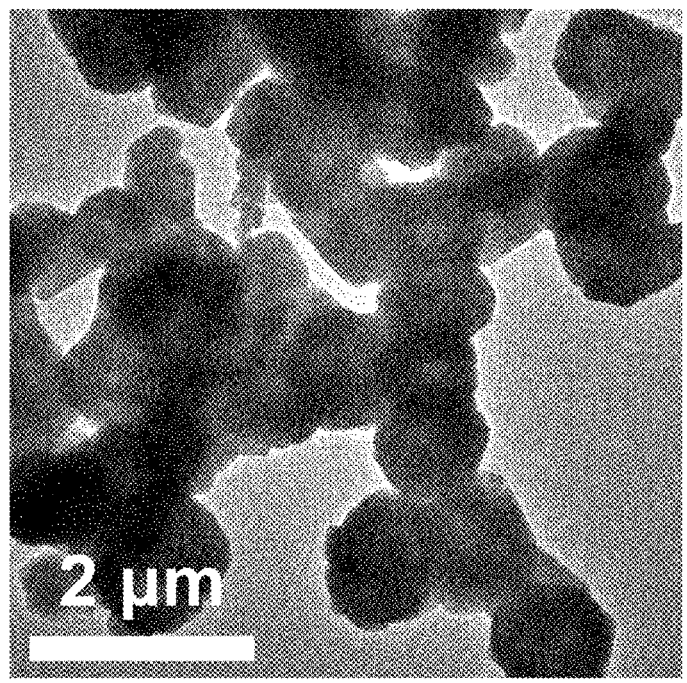
[FIG. 6B]
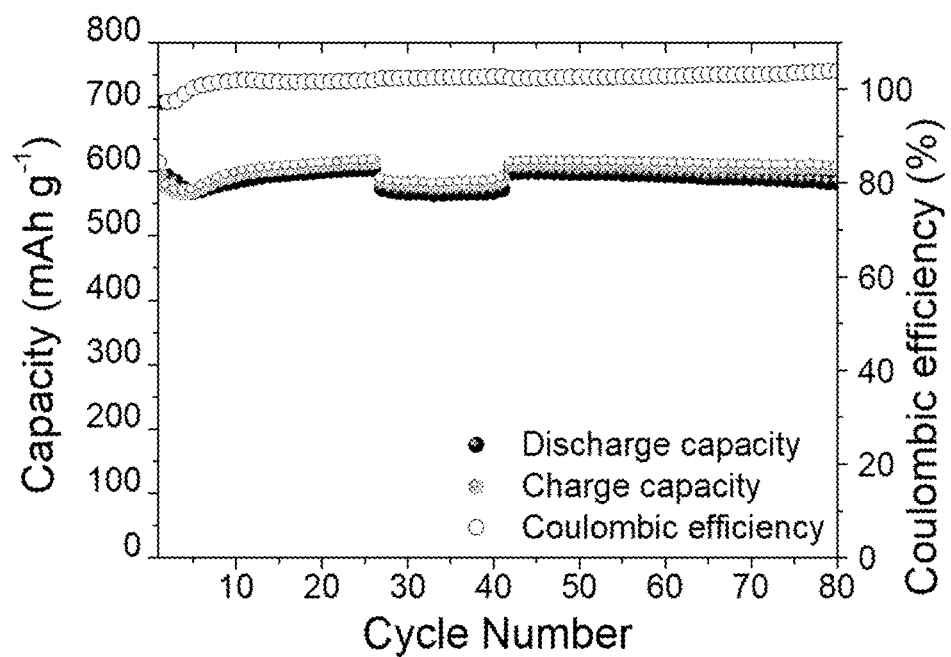

[FIG. 7A]
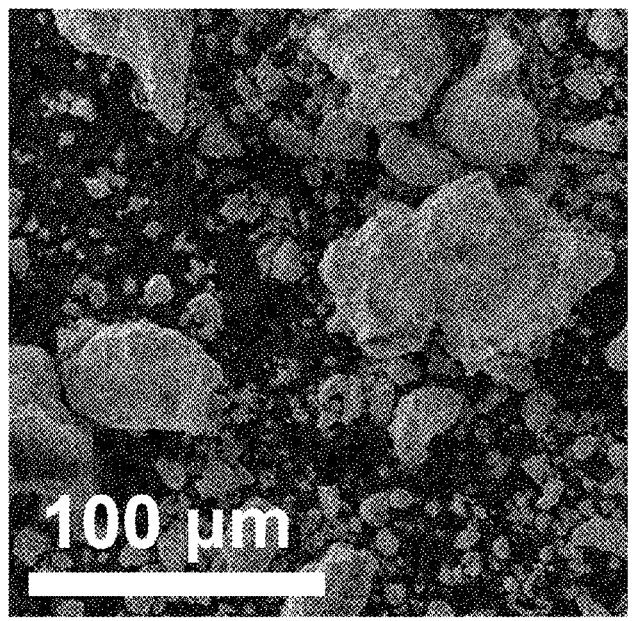
[FIG. 7B]
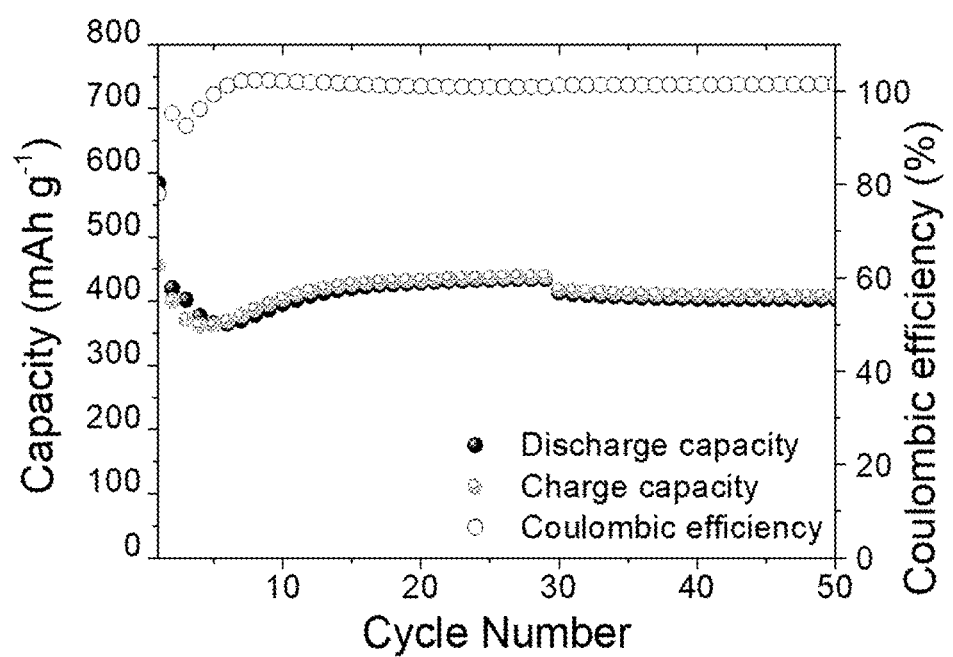

[FIG. 8A]
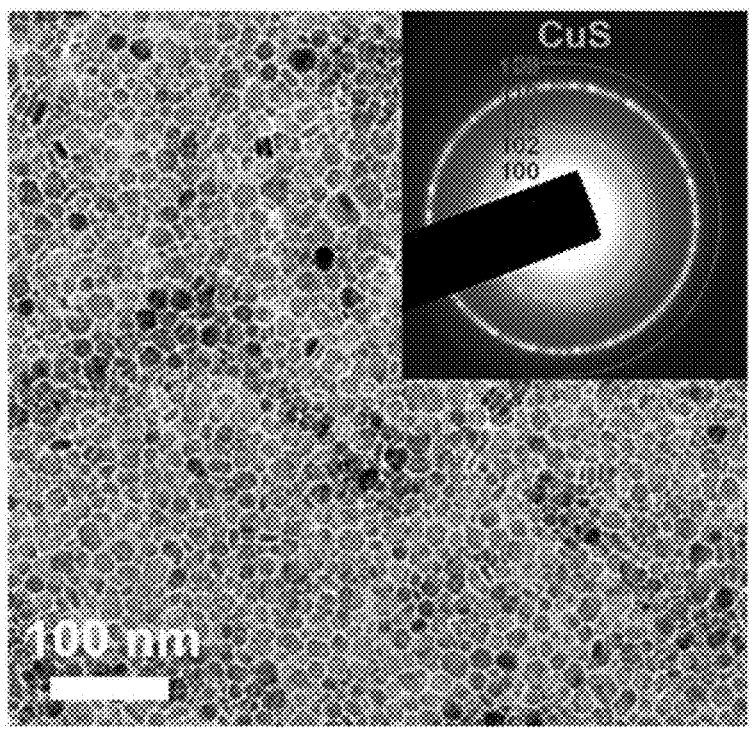
[FIG. 8B]
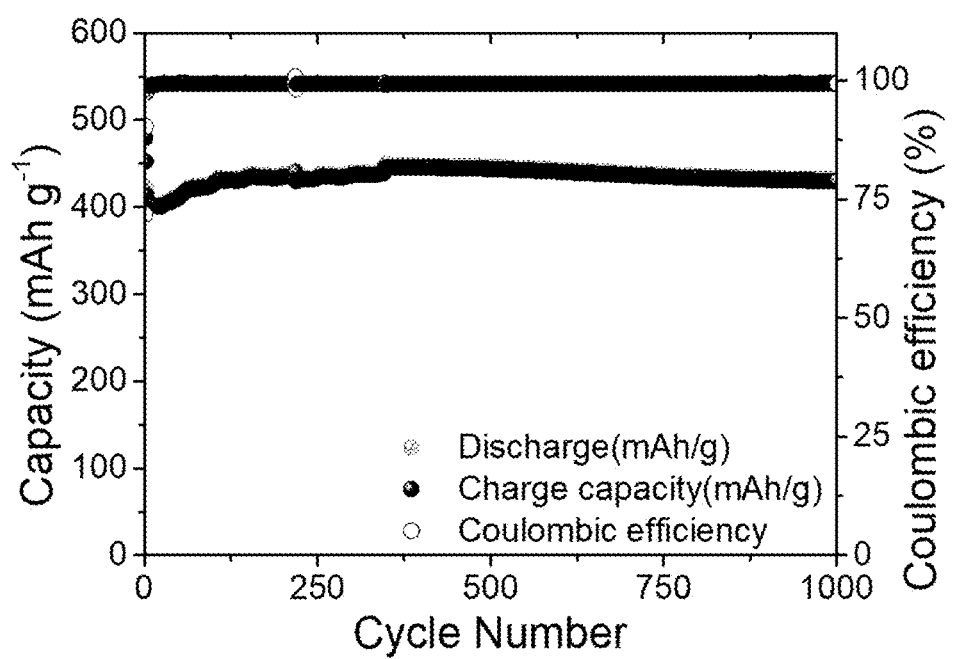

[FIG. 9]
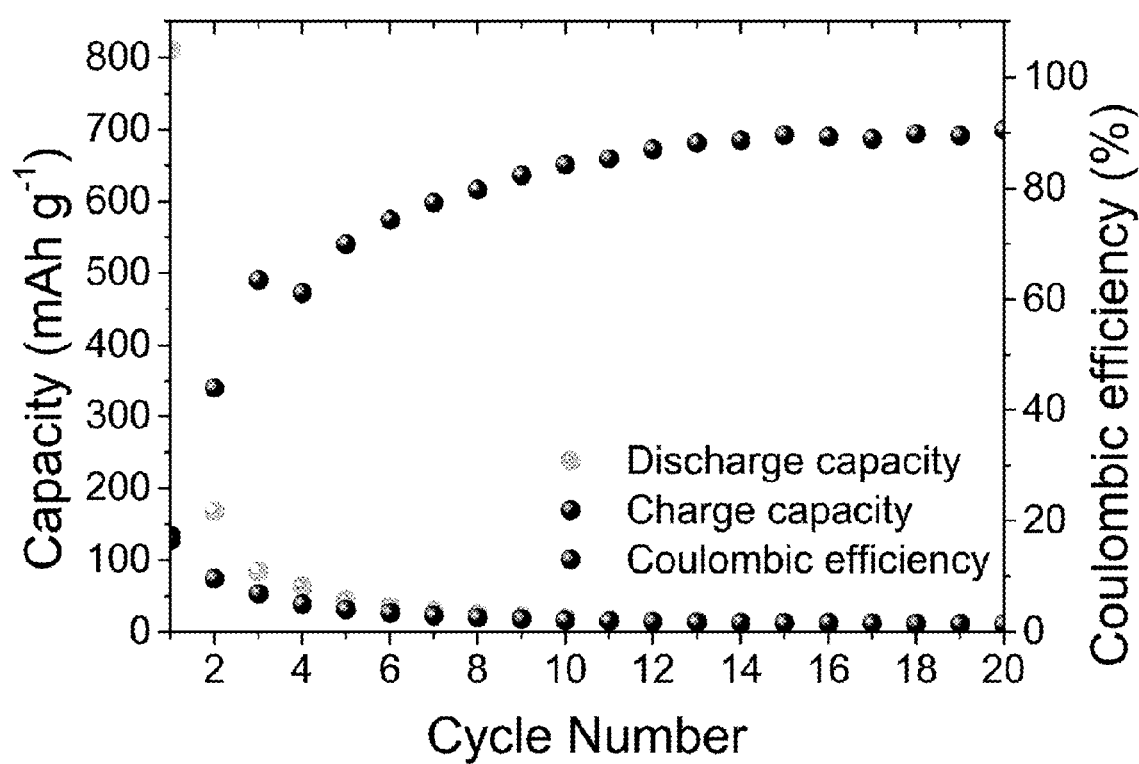

SODIUM ION STORAGE MATERIAL

CROSS-REFERENCE TO RELATED APPLICATIONS

This application is the National Stage filing under 35 U.S.C. 371 of International Application No. PCT/KR2018/008436, filed Jul. 25, 2018, which claims the benefit of priority to Korean Application(s) No. 10-2017-0095590, filed Jul. 27, 2017 and No. 10-2018-0082299, filed Jul. 16, 2018 in the Korean Intellectual Property Office, the disclosures of which are incorporated herein by reference.

TECHNICAL FIELD

The present disclosure relates to a sodium-ion storage material and an electrode material for a sodium-ion battery, an electrode material for a seawater battery, an electrode for a sodium-ion battery, an electrode for a seawater battery, a sodium-ion battery, and a seawater battery, which include the sodium-ion storage material.

BACKGROUND ART

Lithium secondary batteries, such as lithium ion batteries and lithium polymer batteries, have a higher voltage and higher capacity than nickel-cadmium batteries, nickel-hydrogen batteries and the like, and are also lightweight. For this reason, in recent years, there has been expanded use of these lithium secondary batteries as main power sources for mobile communication devices, portable electronic devices, electric bicycles, electric motorcycles, electric vehicles, etc.

For example, in current lithium-ion batteries, lithium-containing transition metal composite oxides such as lithium cobaltate ($LiCoO_2$), lithium nickelate ($LiNiO_2$), lithium iron phosphate ($LiFePO_4$) and the like are generally used as positive electrodes, and graphite, hard carbon and the like, which are capable of intercalating and deintercalating lithium, are used as negative electrodes. In addition, as electrolytes for lithium-ion batteries, there are mainly used those obtained by dissolving electrolyte salts, such as lithium borate tetrafluoride ($LiBF_4$), lithium hexafluorophosphate ($LiPF_6$), lithium arsenate hexafluoride ($LiAsF_6$), lithium perchlorate ($LiClO_4$), lithium bis(trifluoromethanesulfonyl)amide ($LiN(CF_3SO_2)_2$), lithium trifluoromethane sulfonate ($LiCF_3SO_3$), etc. in a mixed organic solvent of a cyclic carbonate, such as propylene carbonate (PC) or ethylene carbonate (EC), and a linear carbonate such as dimethyl carbonate (DMC), diethyl carbonate (DEC) or methyl ethyl carbonate (MEC).

The big problems with current lithium-ion batteries may include regional maldistribution of lithium resources. Under these circumstances, in recent years, studies on primary batteries (seawater batteries, etc.) and secondary batteries using nonaqueous electrolytes based on sodium ions instead of lithium ions have begun. Sodium is an element which is abundant in seawater and is the sixth most abundant element on earth, and thus it is cheap and easy to obtain. That is, in view of the recent trend toward not using rare earth elements, sodium seems to be a very attractive element. In addition, as an negative electrode current collector, a copper foil is used in a lithium-ion battery, but a cheap aluminum foil may be used in a sodium-ion electrode, which is an advantage over the lithium ion battery. Furthermore, sodium is an alkali metal element like lithium, and has properties similar to those of lithium, and the theory itself of sodium ion batteries has been studied for a long time For the sodium-ion batteries as described above, studies have been conducted on positive electrode active materials which are mainly classified into oxide-based materials, such as $NaCrO_2$, $NaMnO_2$, $NaFePO_4$, etc., polyanion-based materials, such as $Na_3V_2(PO_4)_3$, $NaFePO_4$, etc., sulfide-based materials, such as $Na_xTiS_2$, etc., fluoride-based materials, such as $FeF_3$, etc., phosphate-based materials, such as NASICON, etc.

However, studies on negative electrode materials for Na ion batteries are very insignificant. Commercially available lithium-ion batteries are charged and discharged by causing the intercalation phenomenon in which lithium ions move between graphite as an negative electrode active material and a lithium-containing transition metal oxide such as $LiCoO_2$ as a positive electrode active material and move between the molecules of each of the materials. Graphite has a layered molecular structure, and even when lithium ions enter between the graphite layers, the graphite structure is less likely to be broken. In addition, lithium ions with a theoretical capacity of 372 mAh/g may be intercalated. However, sodium ions are not suitable for sodium storage because they have a large ionic radius and are difficult to enter between the graphite layers.

Accordingly, as negative electrode material candidates for sodium-ion batteries, petroleum cokes, carbon black and hard carbon, etc. have been mainly mentioned, but these also have a problem in that the sodium storage capacity is not good. For example, among carbon-based materials, hard carbon-based materials have been reported to have a capacity of ~300 mAh/g, but when considering the voltage characteristics and low initial efficiency thereof, the capacity that can actually be utilized in batteries is 180 mAh/g or less. Meanwhile, materials that undergo an alloying reaction may also be used as negative electrode materials, and examples thereof include Sn, Sb and P. However, these materials have a problem in that the volume expansion is very large. For example, $Na_{15}Sn_4$ undergoes a volume expansion of 525%, and $Na_3P$ undergoes a volume expansion of 490%. This problem also arises in the case of a seawater battery that is a sodium ion primary battery, and hence it is necessary to develop a suitable electrode material that can overcome this problem.

DISCLOSURE

Technical Problem

It is an object of the present disclosure to provide a sodium ion storage material capable of exhibiting excellent charge/discharge cycle characteristics while maintaining high charge/discharge capacity.

Another object of the present disclosure is to provide an electrode material for a sodium-ion battery capable of exhibiting excellent charge/discharge cycle characteristics while maintaining high charge/discharge capacity.

Still another object of the present disclosure is to provide an electrode for a sodium-ion battery capable of exhibiting excellent charge/discharge cycle characteristics while maintaining high charge/discharge capacity.

Yet another object of the present disclosure is to provide a sodium-ion battery capable of exhibiting excellent charge/discharge cycle characteristics while maintaining high discharge capacity.

Still yet another object of the present disclosure is to provide an electrode material for a seawater battery including the sodium-ion storage material, an electrode for a seawater battery including the same, and a seawater battery including the same.

Other objects and advantages of the present disclosure will be more apparent from the following description of the disclosure, the claims and the accompanying drawings.

Technical Solution

One embodiment of the present disclosure is directed to a sodium-ion storage material including one or more materials selected from the group consisting of $Cu_xS$, FeS, $FeS_2$, $Ni_3S$, $NbS_2$, $SbO_x$, $SbS_x$, SnS and $SnS_2$, wherein $0<x\leq2$.

The materials may be particles having a size of 1 nm to 500 μm. Preferably, the materials may be particles having a size of 100 nm to 1000 nm.

In the present disclosure, the materials may have one or more shapes selected from the group consisting of nanoplates, nanospheres, nanowires, hollow nanospheres, nanoboxes, nanodots and nanotubes.

In the present disclosure, the materials may have a nanoplate shape.

In the present disclosure, the nanoplates may have a polygonal plate shape.

In the present disclosure, the nanoplates may have a hexagonal plate shape.

In the present disclosure, the materials may be those in which two nanoplates are oriented to cross each other. In the present disclosure, the first nanoplate of the two nanoplates may be oriented along the {001} plane, and the second nanoplate may be oriented along the {100} plane.

In the present disclosure, the nanoplates may have a diameter between 100 nm and 1000 nm.

In the present disclosure, the nanoplates may have a thickness between 10 nm and 100 nm.

In the present disclosure, an electrode material for a sodium-ion battery or an electrode material for a seawater battery may include the sodium-ion storage material as an electrode active material.

In the present disclosure, the electrode active material may be coated with one or more selected from the group consisting of conductive carbon, precious metals, and metals.

In the present disclosure, the electrode material may further include a binder.

In the present disclosure, the binder may include one or more selected from the group consisting of polyvinylidene fluoride, polyvinyl alcohol, polyacrylic acid, alginic acid, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene butylene rubber, and fluorinated rubber.

In the present disclosure, the electrode material may further include a conductive material.

Another embodiment of the present disclosure is directed to an electrode for a sodium-ion battery or an electrode for a seawater electrode, which includes the electrode material according to the present disclosure.

Still another embodiment of the present disclosure is directed to a sodium-ion battery or a seawater electrode, which includes the electrode according to the present disclosure and an electrolyte.

Advantageous Effects

According to the present disclosure, high charge/discharge capacity may be maintained by using a specific material as a sodium-ion storage material or an electrode material for a sodium-ion battery or a seawater battery. Furthermore, when the sodium-ion storage material is applied to a sodium-ion battery which is a secondary battery, it may exhibit excellent charge/discharge cycle characteristics.

DESCRIPTION OF DRAWINGS

FIG. 1(a) shows an XRD graph of CuS nanoplates produced in Example 1 of the present disclosure.

FIG. 1(b) shows a three-dimensional SEM image of CuS nanoplates produced in Example 1 of the present disclosure.

FIGS. 1(c) and 1(d), respectively, show high-resolution transmission electron micrographs (HR-TEMs) of the side plane and basal plane of CuS nanoplates produced in Example 1 of the present disclosure.

FIG. 2(a) shows charge and discharge profiles of a sodium-ion battery, fabricated in Example 2 of the present disclosure, during 100 cycles at 0.2 C.

FIG. 2(b) graphically shows changes in charge capacity, discharge capacity and coulombic efficiency during 150 cycles at 0.2 C for the CuS nanoplates produced in Example 2 of the present disclosure.

FIG. 3(a) shows bright-field transmission electron microscope (BF-TEM) images of the morphological changes of CuS nanoplates during sodiation.

FIG. 3(b) shows the change in the projected area of a sodiated phase in TEM as a function of electron beam irradiation time. Here, the cyan denotes a pristine CuS phase, the orange denotes $Na_xCuS$ which is a phase during an intercalation reaction, and the blue denotes $Na_2S+Cu$ which is a phase subjected to a conversion reaction.

FIG. 3(c) graphically shows the change rate of a projected total area as a function of electron beam irradiation time.

FIG. 4 shows high-resolution photographs of the sodiation of CuS nanoplates. Specifically, FIG. 4(a) schematically shows the whole sodiation; FIG. 4(b) schematically shows CuS; FIG. 4(c) schematically shows $Na(CuS)_4$; FIG. 4(d) schematically shows $Na_7(Cu_6S_5)_2$; FIG. 4(e) schematically shows $Na_3(CuS)_4$; and FIG. 4(f) schematically shows $Na_2S+Cu$. Here, the purple arrow in FIG. 4(b) and the cyan and blue arrows in FIG. 4(c) show the movement path of sodium in each structure.

FIG. 5(a) shows a high-resolution transmission electron micrograph (HR-TEM) of CuS nanoboxes according to the present disclosure.

FIG. 5(b) graphically shows changes in charge capacity, discharge capacity and coulombic efficiency during 1800 cycles at 1 C for the CuS nanoboxes of FIG. 5(a).

FIG. 6(a) shows a transmission electron micrograph of CuS having a size of 1 μm according to the present disclosure.

FIG. 6(b) graphically shows changes in charge capacity, discharge capacity and coulombic efficiency during 80 cycles at 0.2 C for the CuS nanoboxes of FIG. 6(a).

FIG. 7(a) shows a scanning electron micrograph of CuS having a bulk size according to the present disclosure.

FIG. 7(b) graphically shows changes in charge capacity, discharge capacity and coulombic efficiency during 50 cycles at 0.2 C for the CuS nanoboxes of FIG. 7(a).

FIG. 8(a) shows a transmission electron micrograph of CuS nanodots according to the present disclosure.

FIG. 8(b) graphically shows changes in charge capacity, discharge capacity and coulombic efficiency during 1000 cycles at 3 C for the CuS nanodots of FIG. 8(a).

FIG. 9 graphically shows changes in charge capacity, discharge capacity and coulombic efficiency during 20 cycles at 0.2 C for the CuS nanoplates produced in Example 11 of the present disclosure.

MODE FOR DISCLOSURE

Hereinafter, preferred embodiments of the present disclosure will be described. However, the embodiments of the present disclosure may be modified into other various forms, and the scope of the present disclosure is not limited to the embodiments described below. In addition, the embodiments of the present disclosure are provided to more completely explain the present disclosure to those skilled in the art.

The present inventors have found that when a sulfide composition is used as a sodium-ion storage material, an electrode material for a sodium-ion battery and an electrode material for a seawater electrode, it may exhibit excellent charge/discharge cycle characteristics while maintaining high discharge capacity, unlike a conventional art, and also have found that even when even when the particle size of the sulfide used as the sodium-ion storage material and the electrode material for the sodium-ion battery is not only in nanometer scale but also in bulk form, the sulfide exhibits excellent electrochemical performance, thereby completing the present disclosure.

One embodiment of the present disclosure is directed to a sodium-ion storage material that may include one or more materials selected from the group consisting of $Cu_xS$, FeS, $FeS_2$, $Ni_3S$, $NbS_2$, $SbO_x$, $SbS_x$, SnS and $SnS_2$, wherein $0<x\leq2$. Preferably, the materials may include $Cu_xS$ ($0<x\leq2$). More preferably, the materials may include CuS.

The materials included in the sodium-ion storage materials may be bulk or nano-sized materials having a size between 1 nm and 500 µm. The nano-sized materials may be particles having a size between 1 nm and 1000 nm, and may have one or more shapes selected from the group consisting of nanoplates, nanospheres, nanowires, hollow nanospheres, nanoboxes, nanodots and nanotubes. Preferably, the nano-sized materials may have a nanoplate shape.

In the present disclosure, the "nanoplate" means a two-dimensional plate structure different from a powder shape or a particle shape.

In the present disclosure, "nanowire" means a wire structure having a sectional diameter in nanometers. For example, the nanowire may have a sectional diameter between 100 nm and 500 nm and a length between 0.1 µm to 100 µm. For example, the nanowire may have an aspect ratio of 5 or more, 10 or more, specifically 50 or more, more specifically 100 or more. The nanowire may be substantially uniform or variable in diameter, and at least a portion of the long axis of the nanowire may be straight, curved, bent, or branched.

In the present disclosure, the "nanosphere" means a sphere structure having a diameter in nanometers. For example, the diameter of the nanosphere is preferably 100 to 1000 nm, particularly preferably 200 to 500 nm.

In the present disclosure, the "hollow nanosphere" is a nano-hollow structure having a diameter in nanometers, and has only a shell and a hollow interior, like a ball. The diameter of the hollow nanosphere is preferably 100 to 1000 nm, particularly preferably 200 to 500 nm.

In the present disclosure, "nanobox" means a box shape having a length in nanometers, and the length of the nanobox is preferably 100 to 1000 nm, particularly preferably 100 to 200 nm.

In the present disclosure, the "nanodot" means a dot shape having a length in nanometers. The nanodot preferably has a size of 1 to 30 nm.

In the present disclosure, the "nanotube" means a cylindrical tube structure having a length in nanometers. The length of the nanotube is preferably 100 to 1000 nm, particularly preferably 100 to 200 nm.

In the present disclosure, the nanoplate is not particularly limited in its crystal structure as long as it is capable of reversibly intercalating sodium ions during charge/discharge. However, the nanoplate may preferably have a polygonal plate shape, for example, a hexagonal, pentagonal, square, triangular, parallelogram or trapezoidal shape. Preferably, it may have a hexagonal shape.

In addition, in the present disclosure, the materials may be those in which two nanoplates are oriented to cross each other. Preferably, the first nanoplate of the two nanoplates may be oriented along the {001} crystallographic plane, and the second nanoplate may be oriented along the {100} crystallographic plane.

In the present disclosure, the diameter of the nanoplate may be between 100 nm to 1000 nm, preferably between 100 nm to 500 nm.

In addition, the thickness of the nanoplate may be between 10 nm to 100 nm, preferably between 10 nm to 50 nm.

In the present disclosure, when the nanoplate material has a size (diameter or length) between 100 nm to 1000 nm, the shape thereof in the initial stage of the sodiation process may be maintained, and thus may provide a large surface area for insertion and extraction of sodium ions. As cycling proceeds, a large number of crystal grains are created, and the inter-crystal grain boundaries facilitate the entry and exit of Na. As a result, when the nanoplate is used as the sodium-ion storage material of the present disclosure, it may have a specific capacity close to a theoretical value as the number of cycles increases.

The present disclosure also provides an electrode material for a sodium-ion battery and an electrode material for a seawater battery, which include the sodium ion storage material as an electrode active material, preferably a negative electrode active material.

In the present disclosure, the electrode active material may be coated with a conductive material to further increase the electrical conductivity. In the present disclosure, the conductive material may be one or more selected from the group consisting of conductive carbon, precious metals, and metals. In particular, coating with conductive carbon is preferable because it can effectively increase the conductivity without significantly increasing the production cost and weight.

In the present disclosure, the conductive carbon may be one or more selected from the group consisting of carbon black, carbon nanotubes, and graphene, but is not limited thereto.

In the present disclosure, the conductive carbon may be used for coating in an amount of more than 2 wt % and not more than 5 wt %, preferably 2.5 wt % to 5 wt %, based on the total weight of the nanoplates. If the amount of the conductive carbon is excessively large, the amount of the nanoplates is relatively decreased, resulting in a decrease in the overall characteristics of the battery, and if the amount of the conductive carbon is excessively small, it is not preferable because the nanoplates cannot exhibit the effect of improving the electrical conductivity.

In the present disclosure, the conductive carbon may be applied to the surface of electrode active material particles.

For example, it may coat the surface of electrode active material particles to a thickness of 0.1 nm to 20 nm.

In the present disclosure, in the case of primary particles coated with the conductive carbon in an amount of 0.5 to 1.5 wt % based on the total weight of the electrode active material, the thickness of the carbon coating layer may be about 0.1 nm to 2.0 nm.

In the present disclosure, the electrode material may further include, in addition to the electrode active material, a binder and optionally a conductive material.

In the present disclosure, the binder serves to allow the electrode active material particles to adhere well to one another and improve the binding of the negative electrode active material to the current collector. Examples of the binder include, but are not particularly limited to, polyvinylidene fluoride, polyvinyl alcohol, polyacrylic acid, alginic acid, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene-butylene rubber, fluorinated rubber, and various copolymers.

In the present disclosure, the binder may be included in an amount of 1 to 20 parts by weight based on 100 parts by weight of the electrode active material, but is not limited thereto.

In the present disclosure, a solvent for the binder is not particularly limited, but may be, for example, N-methylpyrrolidone (NMP), acetone or water.

In the present disclosure, the solvent is included in an amount of 1 to 10 parts by weight based on 100 parts by weight of the negative electrode active material in view of facilitating an operation for forming the negative electrode material.

In addition, the electrode material of the present disclosure may optionally further include a conductive material to further increase the electrical conductivity. As the conductive material, any material that is generally used in sodium-ion batteries may be used. Examples of the conductive material include carbon-based materials, such as carbon black, acetylene black, Ketjen black, and carbon fibers; metal-based materials, such as metal powder or metal fibers of copper, nickel, aluminum, silver, etc.; conductive polymers such as polyphenylene derivatives; or mixtures thereof. The content of the conductive material may be suitably adjusted for use.

In addition, in the present disclosure, the particle size of the conductive material is preferably 2 nm to 1 µm. If the particle size of the conductive material is less than 2 nm, a problem may arise in that it is difficult to form a uniform slurry in an electrode fabrication process, and if the particle size of the conductive material is more than 1 µm, a problem may arise in that the conductive material cannot improve the electrical conductivity of the electrode.

Furthermore, in the present disclosure, the electrode active material and the conductive material may be included at a weight ratio of 9:1 to 99:1, more preferably 9:1, but are not limited thereto.

In the present disclosure, the terms "sodiate" and "sodiation" may refer to a process of inserting sodium into the electrode material.

In the present disclosure, the terms "desodiate" and "desodiation" may refer to a process of removing sodium from the electrode material.

In the present disclosure, the terms "charge" and "charging" may refer to a process of providing electrochemical energy to a battery.

In the present disclosure, the terms "discharge" and "discharging" may refer to a process of removing electrochemical energy from a battery, for example, when using the battery to perform desired work.

In the present disclosure, the term "positive electrode" may refer to an electrode (often called a cathode) where electrochemical reduction and lithiation occurs during a discharging process.

In the present disclosure, the term "negative electrode" may refer to an electrode (often called an anode) where electrochemical oxidation and delithiation occur during a discharging process.

Another embodiment of the present disclosure is directed to a method for producing the electrode active material according to the present disclosure. The method may include the steps of: (a) mixing cetyl trimethylammonium bromide (CTAB), hexane, n-pentanol and copper nitrate ($Cu(NO_3)_2 \cdot 3H_2O$) to form a microemulsion; (b) adding the microemulsion to carbon disulfide; and (c) performing drying at a temperature of 150 to 200° C. for 12 to 24 hours.

In the present disclosure, CuS nanoplates having a diameter of 100 nm to 1000 nm and a thickness of 10 nm to 100 nm may be produced as an electrode active material by the above-described process.

In the present disclosure, the CuS nanoplates produced as described above may have a polygonal plate shape, for example, a hexagonal, pentagonal, square, triangular, parallelogram or trapezoidal shape. More preferably, the CuS nanoplates may have a hexagonal shape.

In addition, in the present disclosure, the CuS nanoplates, more specifically, two nanoplates, may be oriented to cross each other, so that their section may show an 'X' shape. Preferably, the first nanoplate of the two nanoplates may be oriented along the {001} crystallographic plane, and the second nanoplate may be oriented along the {100} crystallographic plane.

Each step of the method of the present disclosure will now be described.

Step (a): Cetyl trimethylammonium bromide (CTAB), hexane, n-pentanol and copper nitrate ($Cu(NO_3)_2 \omega 3H_2O$) may be mixed with one another to form a microemulsion.

Here, the n-pentanol may be added in an amount of 8.65 moles based on the cetyl trimethylammonium bromide, and the copper nitrate may be added in an amount of 10 moles based on the cetyl trimethylammonium bromide, but the present disclosure is not limited thereto.

In addition, the cetyl trimethylammonium bromide may be used at a concentration of 0.1 M, and the copper nitrate may be used at a concentration of 0.2 M, but the present disclosure is not limited thereto.

Step (b): The microemulsion may be added to carbon disulfide.

In the present disclosure, the carbon disulfide may be added to the microemulsion at a volume ratio of 100:0.7 to 0.9, but is not limited thereto.

Step (c): A step of drying at a temperature of 150° C. to 200° C. for 12 to 24 hours may be performed.

In the present disclosure, the drying may be performed in an autoclave, but is not limited thereto.

In the present disclosure, a black precipitate, that is, CuS nanoplates, may be produced by step (c), and if necessary, a step of after washing the CuS nanoplates several times with a solvent, drying in a vacuum oven at a temperature of 50 to 70° C., may be performed.

In addition, in the present disclosure, a step of coating the surface of the CuS nanoplates with a conductive material to increase the electrical conductivity of the nanoplates may further be performed.

In the present disclosure, the conductive material may be one or more selected from the group consisting of conductive carbon, precious metals, and metals. In particular, coating with conductive carbon is preferable because it can effectively increase the conductivity without significantly increasing the production cost and weight.

In the present disclosure, the conductive carbon may be one or more selected from the group consisting of carbon black, carbon nanotubes, and graphene, but is not limited thereto.

In the present disclosure, the conductive carbon may be used for coating in an amount of more than 2 wt % and not more than 5 wt %, preferably 2.5 wt % to 5 wt %, based on the total weight of the nanoplate. If the amount of the conductive carbon is excessively large, the amount of the nanoplates is relatively decreased, resulting in a decrease in the overall characteristics of the battery, and if the amount of the conductive carbon is excessively small, it is not preferable because the nanoplates cannot exhibit the effect of improving the electrical conductivity.

In the present disclosure, the conductive carbon may be applied to the surface of the nanoplates. For example, it may coat the surface of primary particles to a thickness of 0.1 nm to 10 nm and coat the surface of secondary particles to a thickness of 0.1 nm to 20 nm.

In the present disclosure, in the case of primary particles coated with the conductive carbon in an amount of 0.5 to 1.5 wt % based on the total weight of the nanoplates, the thickness of the carbon coating layer may be about 0.1 nm to 2.0 nm.

Still another embodiment of the present disclosure is directed to an electrode for a sodium-ion battery and an electrode for a seawater battery, which include the electrode material according to the present disclosure. In the present disclosure, the electrode may be a negative electrode.

The electrode material may be coated directly on a current collector to prepare an electrode plate. Alternatively, the electrode material may be cast on a separate support, and an electrode material film peeled from the support may be laminated onto a current collector to obtain an electrode plate. In the present disclosure, the electrode is not limited to the above-mentioned forms, but may also be in forms other than the mentioned forms.

In the present disclosure, the current collector may generally have a thickness of 3 μm to 500 μm. In the present disclosure, the current collector is not particularly limited as long as it has conductivity without causing chemical changes in the battery. For example, the current collector may be formed of copper, stainless steel, aluminum, nickel, titanium or baked carbon, and may optionally be surface-treated with carbon, nickel, titanium, silver, or the like. Alternatively, the current collector may be formed of an aluminum-cadmium alloy. In addition, fine irregularities may also be formed on the surface of the current collector to enhance the binding of the electrode active material, and the current collector may be used in various forms such as a film, a sheet, a foil, a net, a porous body, a foam, a nonwoven fabric and the like.

Yet another embodiment of the present disclosure is directed to a sodium-ion battery and a seawater battery, which include the electrode according to the present disclosure and an electrolyte. When the electrode according to the present disclosure is a negative electrode, a positive electrode may be fabricated by coating a positive electrode material including a positive electrode active material directly on a current collector, or may be obtained as a positive electrode plate by casting the positive electrode material on a separate support and laminating a positive electrode material film, peeled from the support, onto a current collector. In the present disclosure, the positive electrode is not limited to the above-mentioned forms, but may also be in forms other than the mentioned forms.

When the electrode according to the present disclosure is a negative electrode, a compound (a sodium intercalation compound) capable of reversibly intercalating and deintercalating sodium may be used as the positive electrode active material. A more specific positive electrode active material is not particularly limited, but is preferably a sodium-transition metal composite oxide. The sodium-transition metal composite oxide may be, for example, one or more selected from the group consisting of $NaMn_2O_4$, $NaNiO_2$, $NaCoO_2$, $NaFeO_2$, $NaNi_{0.5}Mn_{0.5}O_2$, $NaCrO_2$, $Na_{0.9}Mg_{0.05}Ni_{0.5}Mn_{0.5}O_2$ and $Na_{0.9}Ca_{0.05}Ni_{0.5}Mn_{0.5}O_2$. In some cases, two or more electrode active materials may be used in combination.

In the present disclosure, the positive electrode material may further include, in addition to the positive electrode active material layer, a binder, a solvent and optionally a conductive material.

In the present disclosure, the binder serves to allow the electrode active material particles of nanoplates to adhere well to one another and improve the binding of the negative electrode active material to the negative electrode current collector. Examples of the binder include, but are not particularly limited to, polyvinyl alcohol, polyacrylic acid, alginic acid, carboxymethyl cellulose, hydroxypropyl cellulose, diacetyl cellulose, polyvinyl chloride, carboxylated polyvinyl chloride, polyvinyl fluoride, ethylene oxide-containing polymers, polyvinylpyrrolidone, polyurethane, polytetrafluoroethylene, polyvinylidene fluoride, polyethylene, polypropylene, styrene-butadiene rubber, acrylated styrene-butadiene rubber, epoxy resins, and nylon.

In the present disclosure, the binder may be included in an amount of 1 to 20 parts by weight based on 100 parts by weight of the positive electrode active material, but is not limited thereto.

In the present disclosure, a solvent for the binder is not particularly limited in the kind thereof, but may be, for example, N-methylpyrrolidone (NMP), acetone or water.

In the present disclosure, the solvent is included in an amount of 1 to 10 parts by weight based on 100 parts by weight of the positive electrode active material in view of facilitating an operation for forming the positive electrode material.

In addition, the positive electrode material of the present disclosure may optionally further include a conductive material to further increase the electrical conductivity. As the conductive material, any material that is generally used in sodium-ion batteries may be used. Examples of the conductive material include carbon-based materials, such as carbon black, acetylene black, Ketjen black, and carbon fibers; metal-based materials, such as metal powder or metal fibers of copper, nickel, aluminum, silver, etc.; conductive polymers such as polyphenylene derivatives; or mixtures thereof. The content of the conductive material may be suitably adjusted for use.

In addition, in the present disclosure, the particle size of the conductive material is preferably 2 nm to 1 μm. If the particle size of the conductive material is less than 2 nm, a problem may arise in that it is difficult to form a uniform slurry in an electrode fabrication process, and if the particle size of the conductive material is more than 1 μm, a problem may arise in that the conductive material cannot improve the electrical conductivity of the electrode.

Furthermore, in the present disclosure, the electrode active material and the conductive material may be included at a weight ratio of 1:9 to 99:1, more preferably 1:1 to 9:1, but are not limited thereto.

In the present disclosure, the current collector may generally have a thickness of 3 μm to 500 μm. In the present disclosure, the current collector is not particularly limited as long as it has conductivity without causing chemical changes in the battery. For example, the current collector may be formed of copper, stainless steel, aluminum, nickel, titanium or baked carbon, and may optionally be surface-treated with carbon, nickel, titanium, silver, or the like. Alternatively, the current collector may be formed of an aluminum-cadmium alloy. In addition, fine irregularities may also be formed on the surface of the current collector to enhance the binding of the electrode active material, and the current collector may be used in various forms such as a film, a sheet, a foil, a net, a porous body, a foam, a nonwoven fabric and the like.

In the present disclosure, the electrolyte may include a liquid electrolyte, a solid electrolyte, or a combination thereof. The liquid electrolyte may include a sodium salt, an organic solvent, or a combination thereof, and the solid electrolyte may include a polymer compound-containing organic solid electrolyte, an inorganic solid electrolyte, or a combination thereof.

In the present disclosure, when the electrolyte is a liquid electrolyte, it includes an electrolyte salt and a solvent.

Specifically, the electrolyte salt that is used in the present disclosure may be any one or a mixture of two or more selected from among sodium-containing hydroxide (e.g., sodium hydroxide (NaOH), etc.), borates (e.g., sodium metaborate ($NaBO_2$), borax ($Na_2B_4O_7$), boric acid ($H_3BO_3$), etc.), phosphates (e.g., sodium phosphate tribasic ($Na_3PO_4$), sodium pyrophosphate ($Na_2HPO_4$), etc.), chloric acid (e.g., $NaClO_4$, etc.), $NaAlCl_4$, $NaAsF_6$, $NaBF_4$, $NaPF_6$, $NaSbF_6$, $NaCF_3SO_3$ or $NaN(SO_2CF_3)_2$.

In the present disclosure, the electrolyte may include the electrolyte salt in an amount of 2 to 5 wt % based on the total weight of the electrolyte.

In addition, in the present disclosure, the solvent may be used without particular limitation as long as it may serve as a medium through which ions involved in the electrochemical reaction of the battery can move. Specifically, the solvent may be an aqueous solvent such as water, alcohol, or the like; or a non-aqueous solvent such as an ester solvent, an ether solvent, a ketone solvent, an aromatic hydrocarbon solvent, an alkoxyalkane solvent, or a carbonate solvent. These solvents may be used alone or as a mixture of two or more.

Particularly, the solvent that is used in the present disclosure may preferably be an ester solvent. Specific examples of the solvent include methyl acetate, ethyl acetate, n-propyl acetate, dimethyl acetate, methyl propionate, ethyl propionate, γ-butyrolactone, decanolide, γ-valerolactone, mevalonolactone, γ-caprolactone, δ-valerolactone, or ε-caprolactone.

More preferred examples of the ether-based solvents include diethylene glycol dimethyl ether (diglyme), dibutyl ether, tetraglyme, 2-methyltetrahydrofuran, or tetrahydrofuran. For reference, when comparing Example 3 and Example 11, in which the electrochemical performance of CuS nanoplates was tested, Example 3 used an ether-based solvent (diglyme) as an electrolyte, and Example 11 used a carbonate-based solvent (EC/DEC) as an electrolyte. From comparison of the results of the two tests, it can be seen that the electrochemical performance of Example 3 that used the ether-based solvent is much better.

In the present disclosure, specific examples of the ketone-based solvent include cyclohexanone or the like. Specific examples of the aromatic hydrocarbon-based organic solvent include benzene, fluorobenzene, chlorobenzene, iodobenzene, toluene, fluorotoluene, or xylene. Examples of the alkoxyalkane solvent include dimethoxy ethane or diethoxy ethane.

In the present disclosure, specific examples of the carbonate-based solvent include dimethylcarbonate (DMC), diethylcarbonate (DEC), dipropylcarbonate (DPC), methylpropylcarbonate (MPC), ethylpropylcarbonate (EPC), methylethylcarbonate (MEC), ethylmethylcarbonate (EMC), ethylene carbonate (EC), propylene carbonate (PC), butylenes carbonate (BC), or fluoroethylene carbonate (FEC).

In addition, in the present disclosure, when the electrolyte is a solid electrolyte, an organic polymer electrolyte may be used, such as a polyethylene oxide-based polymer compound, a polymer compound including at least one of a polyorganosiloxane chain and a polyoxyalkylene chain, or the like. In addition, a so-called gel-type electrolyte in which a nonaqueous electrolyte solution is retained in a polymer compound may also be used. Furthermore, an inorganic solid electrolyte may also be used, for example, a sulfide electrolyte such as $Na_2S$—$SiS_2$ or $Na_2S$—$GeS_2$, or an NASICON-type electrolyte such as $NaZr_2(PO_4)_3$. The use of these solid electrolytes may further increase safety.

In addition, when a solid electrolyte is used in the sodium secondary battery of the present disclosure, the solid electrolyte may also function as a separator, and in this case, no separator is required.

Furthermore, the electrolyte may further include, in addition to the above-described electrolyte components, additives (hereinafter referred to as 'other additives') that may generally be used in electrolytes for the purposes of improving battery life characteristics, suppressing a decrease in battery capacity, or improving battery discharge capacity, etc.

In the present disclosure, it is preferable that 0.1 to 5 wt % of fluorinated ethylene carbonate further be added to the electrolyte.

When the sodium-ion battery of the present disclosure uses a solid electrolyte as an electrolyte as described above and the solid electrolyte functions as a separator, the sodium-ion battery may require no separator. However, otherwise the sodium-ion battery may further include a separator.

In the present disclosure, the separator functions to separate between the negative electrode from the positive electrode and to provide a passage for the movement of sodium ions, and any separator may be used as long as it is generally used in batteries that use sodium ions. That is, a separator having excellent electrolyte impregnation ability while having low resistance to ion migration in the electrolyte may be used. For example, the separator may be formed of one selected from glass fiber, polyester, Teflon, polyethylene, polypropylene, polytetrafluoroethylene (PTFE), or combinations thereof, and may be in the form of nonwoven or woven fabric. Preferably, in the sodium secondary battery, a polyolefin-based polymer separator may be mainly used, and a coated separator including a ceramic component or a polymer material to ensure heat resistance or mechanical strength may also be used. The separator may optionally be used as a single layer or multilayer structure.

In addition, the sodium secondary battery of the present disclosure may further include, as an additive, FEC (fluoroethylene carbonate), VC (vinylene carbonate), or a combination thereof.

Hereinafter, the present disclosure will be described in more detail. These examples are only for illustrating the present disclosure in more detail, and it will be obvious to those skilled in the art that the scope of the subject matter of the present disclosure is not limited by these examples.

EXAMPLES

Example 1 Production of Negative Electrode Active Material (CuS Nanoplates)

In a Teflon-sealed autoclave, CuS nanoplates having a three-dimensional structure were synthesized using a solvothermal method. Copper nitrate ($Cu(NO_3)_2 \cdot 3H_2O$), cetyl trimethylammonium bromide (CTAB), hexane and n-pentanol, used in the synthesis, were purchased from Sigma-Aldrich. A microemulsion was used, which consists of water containing 0.1 M CTAB (in hexane), 8.65 moles (based on CTAB) of n-pentanol and 10 moles (based on CTAB) of 0.2 M copper nitrate. A 0.2M aqueous solution of copper nitrate was added to a mixture solution of pentanol and hexane containing CTAB, and then stiffed until the solution became transparent. The microemulsion was introduced into a 100 ml Teflon-sealed autoclave, and then 0.8 ml of carbon disulfide was added. The autoclave was placed in an oven and treated at 170° C. for 15 hours. Next, the obtained black precipitate was washed several times with acetone and ethanol and dried in a vacuum oven at a temperature of 60° C. A scanning electron microscope (SEM, Varios 460) and an X-ray diffraction analyzer (XRD, RIGAKU, D/MAX-2500) were used to confirm the three-dimensional structure and crystalline structure of the nanoplates synthesized as described above.

Example 2 In-Situ TEM Sample Preparation

NaF particles and CuS nanoplates were dispersed on graphene coated with a holey carbon Au grid (300 mesh, SPI). Using a conventional transmission electron microscope (TEM) (JEOL, JEM-2100F and ARM-200F) equipped with a charge coupled device (CCD) camera (Orius 1000, Gatan), the sodiation process was observed in real time while applying a voltage of 200 kV. Sodiation is driven by electron beam irradiation of the CuS nanoplates attached to NaF particles via generation of metallic Na from NaF. After sodiation, energy dispersive spectroscopy (EDS) mapping was performed to examine structural changes.

Example 3 Electrochemical Battery Test and Ex-Situ Characterization

To fabricate an electrode, CuS NPs, carbon black (Alfa Aesar) and polyvinylidene fluoride (PVDF, Sigma Aldrich) were mixed at a weight ratio of 8:1:1 in 1-methyl-2-pyrrolidone. The prepared slurry was coated on a Cu foil and dried under vacuum for 12 hours. As an electrolyte, a solution of 1M sodium hexafluorophosphate ($NaPF_6$) in diglyme was used. After a sodium salt was added to the diglyme, the electrolyte was stirred in a glove box at a temperature of 80° C. under an Ar gas atmosphere for 2 days. A pure Na foil and glass fiber were used as a reference electrode and a separator, respectively. A half-cell battery (ECC-STD, EL-CELL) was assembled in a glove box under an Ar gas atmosphere. Using a PARSTAT MC 1000 cell tester (Princeton Applied Research), an electrochemical cell test was performed. Charge/discharge profiles were obtained at 0.2 C rate, at a room temperature and at 0.05 to 2.6 V. For ex-situ experiments, the electrochemical cell was disassembled after a couple of charge/discharge cycles. The active material was thoroughly washed via active sonication for 3 hours in dimethyl carbonate (DMC), and then dispersed onto a grid for TEM examination.

Example 4

Morphology of CuS Nanoplates and Their Electrochemical Properties in Sodiation Process The synthesized CuS nanoplates (space group: $P6_3/mmc$) had a morphology with two thin interweaving plates and had an average diameter of ~300 nm and a thickness of ~30 nm (FIGS. 1(a) and 1(b)). The plates showed a hexagonal structure with crystalline {100} and {001} facets (FIGS. 1(c) and 1(d)). These plates can protect CuS from fractures derived during the sodiation process and also provide a large surface area for sodium insertion and extraction. The charge/discharge profiles and capacity performance of the CuS nanoplates are shown in FIGS. 2(a) and 2(b). After reaching the highest discharge capacity of ~680 mAh/g at the first cycle, the capacity of the nanoplates decreased slightly, but the capacity was gradually recovered from the tenth cycle and reached ~550 mAh/g at the $100^{th}$ cycle, which is known as the theoretical capacity of CuS. Some reduction in the capacity at the initial cycles was due to a sudden decrease in sodium kinetics in the NaxCuS structure; however, as the number of cycles increased, the nanoplate was disintegrated into small pieces and provided short migration paths for sodium, and thus the number of Na escaping from the NaxCuS lattice increased, and as a result, the capacity could be restored again. Once recovered as described above, the capacity and coulombic efficiency were maintained at 560 mAh/g and ~100%, respectively, for 60 cycles. From the presence of more than two plateaus in the discharge profile, it could be seen that more than two steps of intercalation and conversion reactions occurred during sodiation. Typically, intercalation and conversion reactions can be expressed as follows:

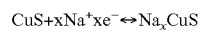

$$CuS + xNa^+ xe^- \leftrightarrow Na_xCuS$$

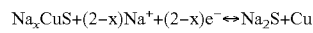

$$Na_xCuS + (2-x)Na^+ + (2-x)e^- \leftrightarrow Na_2S + Cu$$

where x denotes the Na content. Voltage plateaus in the range of 0 to 0.5 V corresponds to the conversion reaction. Thus, it could be seen that the capacity during the intercalation reaction, which corresponds to half of the cell capacity, is very important.

Example 5 Real-Time Observation of Sodiation Process in CuS

To analyze the sodiation dynamics of CuS, observation of CuS nanoplate sodiation was performed in TEM, and the results were observed in real time (FIG. 3(a)). A NaF particle was decomposed by electron beam irradiation that generated Na and triggered the chemical reaction between Na and CuS. The boundary between the intercalated portion and CuS is indicated by a green line, and it could be seen that the sodiation reaction propagated from left to right. Before the first front propagation finished, it could be seen that the boundary between intercalation and conversion reactions, marked by a purple line, moved along the first boundary. Thus, it could be seen that two different reactions occurred simultaneously. These two areas have different diffraction contrasts consistent with the zones of the intercalation (Na$_x$CuS) and conversion (Na$_2$S and Cu) reactions. The conversion reaction was observed during CuS sodiation, and a Na$_2$S matrix and Cu nanoparticles were produced during the reaction. From the observed crystalline Na$_2$S matrix, it could be seen that CuS sodiation follows the displacement route rather than the conventional conversion route that produces the amorphous Na$_2$S matrix. After the standard electrochemical test for CuS, TEM imaging was performed and an overlap between the intercalation and conversion reactions was analyzed.

To quantitatively analyze the dynamics of CuS sodiation, the areal changes of the two reaction regions were measured from time-sequential TEM images CuS (FIG. 3(b)). Upon Na insertion, the intercalation reaction initiated with its area increasing gradually for 57 seconds, and the conversion reaction also initiated at 24 seconds. After 57 seconds, the intercalation reaction rate decreased, but the conversion reaction showed a relatively high areal increase rate. Finally, the conversion reaction reached higher than the intercalation reaction and caught up the intercalation reaction (FIG. 3(c)). Since the intercalation reaction initially proceeded with its area increasing gradually, the rate of the intercalation reaction was controlled by the reaction between sodium and CuS. Then, the conversion reaction was initiated and the speed of the intercalation drastically decreased reduced as sodium was depleted. The area change rate of the conversion reaction was relatively higher than that of the intercalation, and thus the two reaction fronts became indistinguishable. Then, the entire nanoplate underwent the conversion reaction.

Example 6 HR-TEM Observation of NaxCuS Change

As shown in FIG. 2(a), it could be seen that a sodium discharge profile of CuS showed the presence of two or more plateaus. This implies that CuS nanoplates undergo more than a simple two-step intercalation—conversion process. Thus, real-time high-resolution imaging was performed to examine the atomic structures of all the reaction phases and analyze the sodiation mechanism of CuS. During the intercalation reaction, the reaction front propagated along the <210> crystal plane. During the propagation, sodium was inserted by layer-by-layer in parallel to the {100} plane. High-resolution TEM images were obtained at different stages of sodiation, and the results are shown in FIG. 4. Sodium insertion into CuS generated multiple phases. In the first intercalation step, CuS with a hexagonal structure (P6$_{3/mmc}$) changed to structurally similar Na(CuS)$_4$ with a trigonal structure (P$\bar{3}$ml), resulting in a slight expansion of the CuS lattice. Inserted Na broke CuS$_x$tetrahedral columns (marked as blue tetrahedra) and was positioned at the {001} plane in the Na(CuS)$_4$ lattice. Na insertion expelled neighboring Cu atoms and repositioned them with S atoms. As a result, Cu and S atoms were coordinated in roto-inversion symmetry along the Na planes. Upon further Na insertion, the second structural change occurred. Sodium atoms were inserted along the {001} plane in the Na(CuS)$_4$ crystal and were rearranged inside the structure, and the structure of CuS$_x$tetrahedron also changed. As a result, a new metastable, monoclinic structure (P2/m) Na$_7$(Cu$_6$S$_5$)$_2$ was formed. During this transition, the bond length between Cu and S atoms increased by ~12%.

In the final intercalation step, the metastable Na$_7$(Cu$_6$S$_5$)$_2$ phase changed to the orthorhombic Na$_3$(CuS)$_4$ (Pbam) crystal. The two structures were crystallographically similar. As shown in FIG. 4(d), the {00$\bar{2}$} Na$_3$(CuS)$_4$ plane matched with the {$\bar{2}$01} Na$_7$(Cu$_6$S$_5$)$_2$ plane. CuS$_x$tetrahedra were translated by 5.16 Å between the two S rows by breaking the bonds between bridging S atoms. As a result, more Na atoms were inserted between two CuS$_x$ columns, and pre-existing Na atoms almost maintained their positions. Ultimately, sodium insertion over x$_{Na}$=0.75 transformed the intercalated structure into a crystalline Na$_2$S matrix and Cu nanoparticles via the conversion reaction (FIG. 4(e)).

Example 7 Electrochemical Properties for CuS Nanoboxes

FIG. 5(b) shows the results of measuring changes in charge capacity, discharge capacity and coulombic efficiency for the CuS nanoboxes shown in FIG. 5(a).

During the initial cycles, the capacity decreased slightly similar to that described above. However, since then, the capacity recovered rapidly and reached ~300 mAh/g at the 100$^{th}$ cycle, which is known as the theoretical capacity level of CuS. It could be confirmed that once recovered similar to that described above, the capacity and the coulombic efficiency were maintained at ~300 mAh/g and ~100%, respectively, for 1800 cycles.

Example 8 Electrochemical Properties for 1 μm CuS

FIG. 6(b) shows the results of measuring changes in charge capacity, discharge capacity and coulombic efficiency during 80 cycles at 0.2 C for the 1-μm-sized CuS shown in FIG. 6(a).

It could be confirmed that, during the initial cycles, the capacity decreased slightly to 500 mAh/g, but after recovered similar to that described above, the storage capacity and the coulombic efficiency were maintained at ~550 mAh/g and ~100%, respectively, for 80 cycles.

Example 9 Electrochemical Properties for Bulk CuS

FIG. 7(b) shows the results of measuring changes in charge capacity, discharge capacity and coulombic efficiency during 50 cycles at 0.2 C for the bulk-sized CuS shown in FIG. 7(a).

It could be confirmed that, during the initial cycles, the capacity decreased to ~350 mAh/g, but after recovered similar to that described above, the storage capacity and the coulombic efficiency were maintained at ~410 mAh/g and ~100%, respectively, for 50 cycles.

Example 10 Electrochemical Properties for CuS Nanodots

FIG. 8(b) shows the results of measuring changes in charge capacity, discharge capacity and coulombic efficiency during 100 cycles at 0.2 C for the nanodot-type CuS shown in FIG. 8(a); FIG. 8(c) shows the results of measuring changes in charge capacity, discharge capacity and coulombic efficiency during 2000 cycles at 3 C for the nanodot-type CuS; and FIG. 8(d) shows the results of measuring the changes in charge capacity, discharge capacity and coulombic efficiency with current density changes at 0.2 to 3 C for the nanodot-type CuS.

Referring to the figures, when cycled at 0.2 C, it could be confirmed that the storage capacity decreased slightly to ~500 mAh/g, but then recovered, and the storage capacity and the coulombic efficiency were maintained at ~530 mAh/g and ~100%, respectively, after 100 cycles.

When cycled at 3C, it could be confirmed that the storage capacity decreased slightly to ~432 mAh/g, but then recovered, and the storage capacity and the coulombic efficiency were maintained at 505 mAh/g and ~100%, respectively, after ~900 cycles, and maintained at 405 mAh/g and ~100%, respectively, after 2000 cycles.

The reduction in the initial capacity lowering effect in the nanodots is because of a sufficiently large active surface area.

Example 11

An electrode was fabricated according to the same fabrication process as Example 3, except that dimethyl carbonate (DMC) was used as an electrolyte solvent. It could be confirmed that capacity recovery and retention was better when using the ether-based electrolyte of Example 3 than when using the carbonate-based electrolyte.

Although the present disclosure has been described in detail above, it will be obvious to those skilled in the art that the scope of the present disclosure is not limited to the above description, and various modifications and changes are possible, without departing from the technical spirit of the present disclosure as defined in the claims.

The invention claimed is:

1. A sodium-ion battery comprising:
   an electrode comprising electrode materials comprising $CU_xS$ ($0<x≤2$) as an electrode active material; and
   an electrolyte obtained by dissolving sodium hexafluorophosphate ($NaPF_6$) in ether-based solvent,
   wherein the sodium-ion battery is charged or discharged by intercalation and conversion reaction of Na and $Cu_xS$.

2. The sodium-ion battery of claim 1, wherein the electrode materials are particles having a size of 1 nm to 500 μm.

3. The sodium-ion battery of claim 2, wherein the electrode materials have one or more shapes selected from the group consisting of nanoplates, nanospheres, nanowires, hollow nanospheres, nanoboxes, nanodots and nanotubes.

4. The sodium-ion battery of claim 3, wherein the electrode materials have a nanoplate shape.

5. The sodium-ion battery of claim 4, wherein the nanoplates have a polygonal plate shape.

6. The sodium-ion battery of claim 5, wherein the nanoplates have a hexagonal plate shape.

7. The sodium-ion battery of claim 4, wherein the electrode materials are those in which two nanoplates are oriented to cross each other.

8. The sodium-ion battery of claim 7, wherein the first nanoplate of the two nanoplates is oriented along the {001} plane, and the second nanoplate is oriented along the {100} plane.

9. The sodium-ion battery of claim 4, wherein the nanoplates have a diameter of 100 nm to 1000 nm.

10. The sodium-ion battery of claim 4, wherein the nanoplates have a thickness between 10 nm and 100 nm.

11. The sodium-ion battery of claim 1, wherein the electrode active material is coated with one or more selected from the group consisting of conductive carbon, precious metals, and metals.

12. The sodium-ion battery of claim 1, wherein the electrode material further comprises a binder.

13. The sodium-ion battery of claim 12, wherein the binder comprises one or more selected from the group consisting of polyvinylidene fluoride, polyvinyl alcohol, polyacrylic acid, alginic acid, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene-butylene rubber, and fluorinated rubber.

14. The sodium-ion battery of claim 1, wherein the electrode material further comprises a conductive material.

15. A seawater battery comprising:
   an electrode comprising electrode materials comprising $Cu_xS$ ($0<x≤2$) as an electrode active material; and
   an electrolyte obtained by dissolving sodium hexafluorophosphate ($NaPF_6$) in ether-based solvent,
   wherein the seawater battery is charged or discharged by intercalation and conversion reaction of Na and $Cu_xS$.

* * * * *